US006381748B1

(12) United States Patent
Lin et al.

(10) Patent No.: US 6,381,748 B1
(45) Date of Patent: Apr. 30, 2002

(54) APPARATUS AND METHODS FOR NETWORK ACCESS USING A SET TOP BOX AND TELEVISION

(75) Inventors: Eric Lin, Westwood; Howard S. K. Wan, Lexington, both of MA (US)

(73) Assignee: GTE Main Street Incorporated, Wilmington, DE (US)

( * ) Notice: Subject to any disclaimer, the term of this patent is extended or adjusted under 35 U.S.C. 154(b) by 0 days.

(21) Appl. No.: 08/853,035

(22) Filed: May 2, 1997

(51) Int. Cl.[7] .............................................. H04N 7/173
(52) U.S. Cl. ...................................... 725/109; 725/116
(58) Field of Search ............................. 725/74, 78, 82, 725/105, 109, 138, 85, 110, 111, 112, 113, 114, 115, 116, 117, 118, 131, 135, 139; 709/217–219

(56) References Cited

U.S. PATENT DOCUMENTS

| 4,780,758 | A |   | 10/1988 | Lin et al. ....................... 358/86 |
| 4,816,905 | A |   | 3/1989  | Tweedy et al. ................ 358/86 |
| 5,748,255 | A |   | 5/1998  | Johnson et al. .............. 348/553 |
| 5,774,666 | A |   | 6/1998  | Portuesi ................. 395/200.48 |
| 5,973,681 | A | * | 10/1999 | Tanigawa et al. ............ 345/716 |
| 5,982,445 | A | * | 11/1999 | Eyer et al. ................... 348/461 |
| 5,991,800 | A | * | 11/1999 | Burke et al. ................. 725/110 |
| 5,999,970 | A | * | 12/1999 | Krisbergh et al. ........... 725/109 |
| 6,018,764 | A | * | 1/2000  | Field et al. .................. 709/217 |

FOREIGN PATENT DOCUMENTS

EP          0 811 940 A      12/1997    .......... G06F/17/30

OTHER PUBLICATIONS

Tomari, Y et al: "Design and Implementation of Internet–TV" IEEE Transactions on Consumer Electronics, IEEE Inc. New York, US, vol. 43 No. 3 Aug. 1, 1997 pp. 953–959 XP000742584 ISSN: 0098–3063.

WEBTV Networks Inc: "WEBTV and Its Consumer Electronics Licensees Debut First Internet Television Network and Set–Top Box" Jul. 10, 1996 Internet XP002086521.

* cited by examiner

Primary Examiner—John W. Miller
(74) Attorney, Agent, or Firm—Leonard Charles Suchyta (57) ABSTRACT

An Internet gateway video server transmits selection information to a set top box connected to a television. The set top box displays the selection information on the television. A user views the selection information, and inputs user selection requests to the set top box. The Internet gateway video server receives user the requests for information and retrieves the information. The server then converts the network information from a network format to a television format. The conversion includes scanning the network information for selection elements, and adding selection elements for transmission in the television format. The converted network information is then transmitted to the set top box for display on the television. The user may then make further selections based on the displayed network information.

36 Claims, 6 Drawing Sheets

APPARATUS AND METHODS FOR NETWORK ACCESS USING A SET TOP BOX AND TELEVISION

I. BACKGROUND OF THE INVENTION

A. Field of the Invention

The present invention relates generally to accessing a network, and in particular to apparatus and methods for accessing a network using the television as a display device.

B. Description of the Prior Art

A typical home computer today is comprised of hardware and software. The hardware includes a processor, hard drive, modem, monitor, RAM, keyboard, and mouse. The software includes an operating system and application programs. For many users the processing power of a home computer is more than sufficient to meet their needs. Home computers are used in a variety of ways. Many users use word processing and spreadsheet applications, while others perform tasks that require more significant processing power, such as graphics processing. More and more are using their computers to access the Internet, and in particular the World Wide Web (WWW).

Users connect to the Internet and the WWW using a modem. The modem is typically a 28.8 bps modem, and each computer is equipped with a Web browser. The user runs the Web browser, which provides a graphical interface for retrieving Web pages. Once the Web browser is up and running, the user requests the Web browser to retrieve a particular Web page. Most Web browsers allow a user to maintain a "hotlist" of "hotlinks" (i.e., bookmarks) to favorite Web sites. The hotlist is typically implemented as a pull down menu containing Web site addresses previously saved by the user.

The user provides an address to the Web browser using either the hotlist or by typing the address in by hand. The address identifies a Web page location. The Web browser then connects to the network (if not already connected), and retrieves the Web page at the address.

Once a Web page is retrieved it is presented to the user. The user may request further Web pages by selecting a hyperlink on the retrieved page, or by inputting another Web page address. The user selects hyperlinks by manipulating an input device, typically a mouse. The mouse is the primary input device for Web browser, and some of the mouse selections may be supplemented by simple text operations and use of the "Enter" key.

For many people, the cost of a home computer or similar hardware (e.g., a unit(s) including both a television and components of a home computer) is prohibitive, or impractical for their needs. Even for those who have computers, however, Internet access can often be frustratingly slow. Users are usually constrained by modem speeds which make Internet access slow. Faster access could be provided over T1 or ISDN lines, but the costs of such lines is usually prohibitive for most users.

Therefore, while many are interested in the WWW, they cannot justify buying a computer for this purpose alone. Other who can justify the cost can not justify the cost of connecting to a high speed line.

II. SUMMARY OF THE INVENTION

The present invention relates to apparatus and methods for accessing a network, such as the WWW, using a television and low cost set top box. It should be understood that while the discussion below discusses the invention in terms of the Internet, it is also contemplated that the principles described herein could also be applied to other networks, such as intranets.

A preferred embodiment of the invention is an apparatus for retrieving and retransmitting data processing network information in response to a user selection request. The apparatus comprises means for transmitting first selection information to be displayed on a monitor; means for receiving a user selection request based on the transmitted first selection information; means for retrieving data processing network information, in a network format, corresponding to the user selection request; means for transforming the data processing network information from the network format having a first interactive element to a monitor format having a second interactive element; and means for transmitting the data processing network information in the monitor format to the monitor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

IV. DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
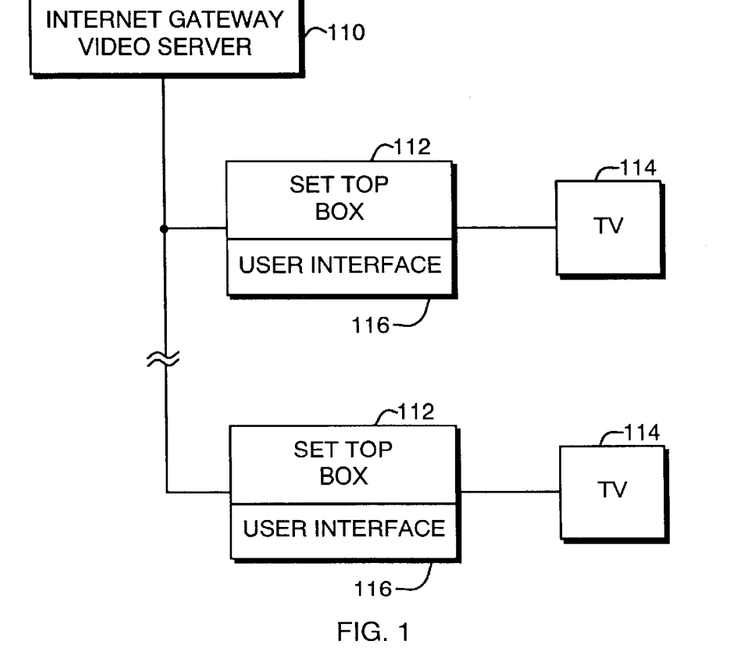
FIG. 1 is a block diagram showing a preferred embodiment of the invention.

FIG. 1 is a block diagram showing a preferred embodiment of the invention. Televisions 114 are connected to set top boxes 112 which send video signals to television 114. Set top boxes 112 are also connected to Internet gateway video server 110 via a television distribution system, and receive frames from Internet gateway video server 110 for display on television 114. Each set top box 112 is individually addressable, and sends information to server 110 which identifies the particular source set top box 112.

In a preferred embodiment, server 110 is located at source end of a television signal, such as a cable system. For example, server 110 may be located at the headend of a television distribution system. Alternatively, server 110 may be located at some other location on the television distribution line. For example, server 110 may be located in an apartment building or hotel between an incoming television distribution line and set top boxes 112. In this manner, "local" Internet access is provided. Moreover, server 110 may perform functions in addition to providing Internet access. For example, server 110 may be dedicated to providing Internet access to set top boxes 112. Alternatively, server 110 may also receive a regular television distribution signal for transmission to set top boxes 112, and provide Internet-related signals or other programming, depending upon the channel selection by the user.

Set top box 112 also receives and responds to signals from user interface 116. The signals may be communicated to Internet gateway video server 110. In a preferred embodiment, user interface 116 comprises an infrared remote control interface for receiving signals from a remote control device (not shown). User interface 116 may comprise any Well known user interface capable of providing selection signals to set top box 112.

Internet gateway video server 110 receives signals from set top box 112 and responds to the signals by (1) interacting with the Internet, or (2) sending video signals for processing by set top box 112 for display on television 114. Server 110 is connected to a high-speed communication line, such as a T1 or ISDN line. Server 110 transmits information generated locally by server 110, or information received from the Internet, to television 114. Server 110 also performs housekeeping functions, such as logging time, in response to information received from the network and signals received from set top box 1 12.

Set top box 112 may process the information received from server 110, or send it directly to television 114. A user views information displayed on television 114 and, using user interface 116, inputs selection information based on what is displayed. Some or all of the user selection signals may be transmitted by set top box 112 to the Internet gateway video server 110. Signals sent from set top box 112 to server 110 include an identification of the set top box 112 and the user selection. Other information may also be provided depending upon the particular implementation of the set top box 112 and server 110.

In response to the user selection signals, server 110 either prepares information locally and transmits the information to set top box 112, or accesses the network for the information requested in the user selection signals. Set top box 112 may process some or all of the user selection signals. For example, set top box 112 may alter the display, and send notification of this change to server 110.

Set top box 112 may be implemented in accordance with the principles similar to those set forth in U.S. Pat. No. 4,780,758 to Lin et al., which is hereby incorporated by reference. The box 112 may be implemented with a built in frame store which continually refreshes the television. A simple set top box 112 may perform little or no processing at all, acting as merely a sample and hold device for the server 110.

Figure 2:
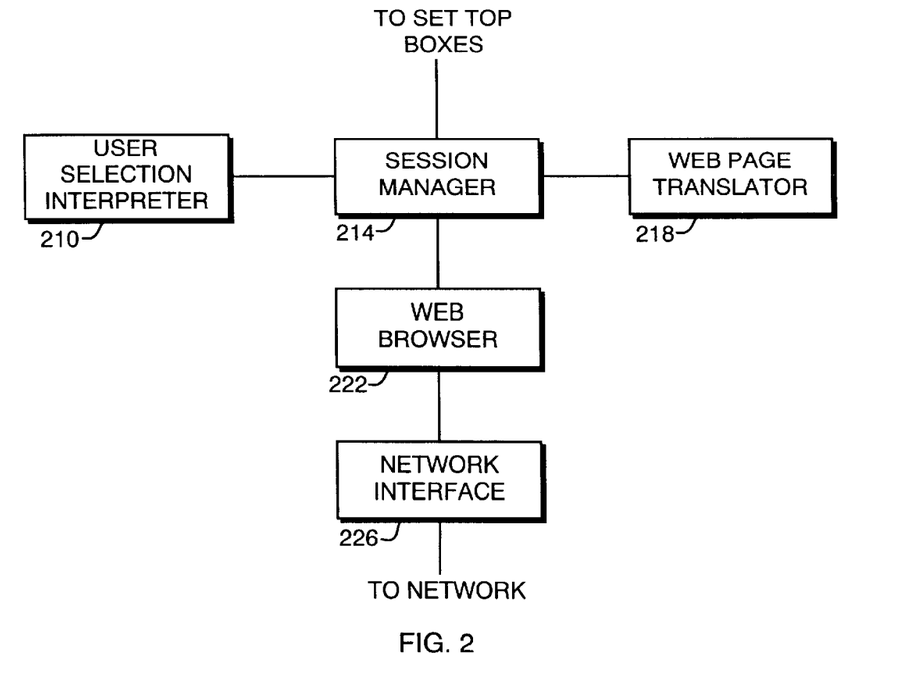
FIG. 2 shows the general architecture of the server in accordance with a preferred embodiment of the invention.

FIG. 2 shows the general architecture of the server 110 in accordance with a preferred embodiment of the invention. Session manager 214 manages the overall information flow within server 110. This includes reception of user selection signals from the set top boxes 112, translations of user request signals, requests for Web pages, translation of Web pages, and transmission of television information to set top boxes 112. In general, session manager 214 keeps track of requests from the user, requests to the web browser, menu presentation, and web page presentation. Session manager 214 receives information from the cable and transmits information to the cable.

In response to user selection signals, session manager 214 either responds directly to the user selection signals or requests translation of the user selection signals by user selection interpreter 210. Interpreter 210 translates user selection signals into Web page addresses. The Web page addresses are sent to manager 214.

In response to the translation, session manager 214 requests Web browser 222 to retrieve a Web page from the network via network interface 226. Once the Web page has been received, it is sent to session manager 214, which requests translation of the Web page by web page translator 218. After translation, the results are transferred to manager 214. Manager 214 then passes at least part of the translated Web page to the set top box 112 associated with the user request.

Session manager 214 keeps track of the multiple users requesting information via the set top boxes 112. User requests are logged and tracked, and presentation information for each set top box 112 is managed in response to the user requests. This may require caching of particular display information to optimize response time to user requests. In summary, session manager 214 and Web browser 222 together form a multi-user Web browser capable of simultaneously managing multiple user sessions on multiple set top boxes 112.

Figure 3:
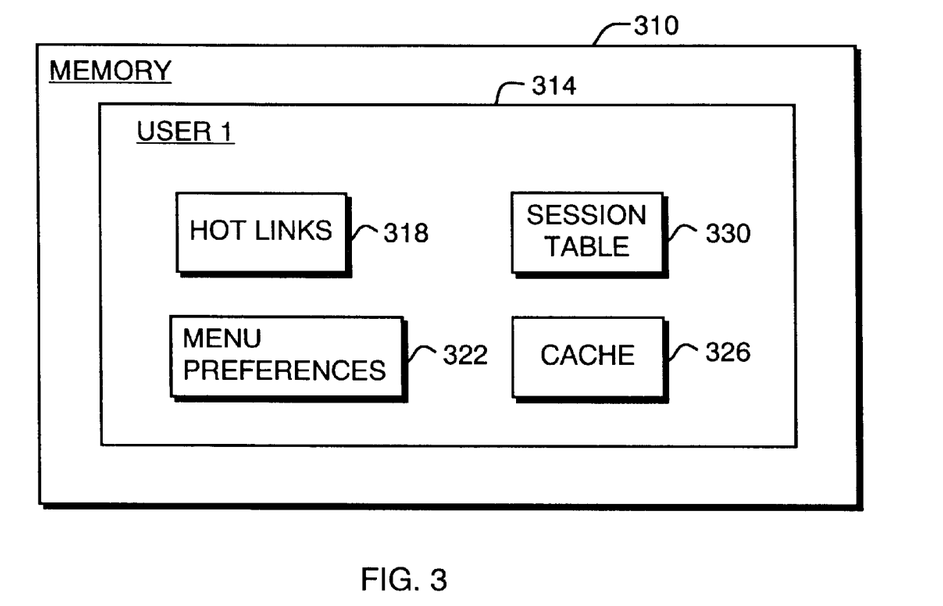
FIG. 3 is a block diagram showing a portion of memory in the server.

FIG. 3 is a block diagram showing a portion of memory 310 in session manager 214. Server 110 implements a single- or multi-user browser system which manages the menus, hotlinks, and Web pages for each user in the system. Each user, therefore, has a dedicated memory area 314 which contains preselected hotlink information 318, menu preferences 322, and a cache or buffer area 326 for storing information flowing between the network, the Internet gateway video server 110, and the set top box 112 or television 114. For example, cache 326 may contain several of the pages most recently displayed on television 114, as well as the most likely pages to be displayed in the near future. In one embodiment, a user session table 330 is also stored in the dedicated memory area. User session table 330 tracks each interaction with a particular set top box 112.

The system may be implemented by having a single centralized cache for all users. In this way, the cache may contain frequently used pages for all users. Each time a request is made for a Web page the cache is checked before the Web page is retrieved. In this embodiment, it is preferable to have a time out mechanism for the cache to remove old Web pages which may have become stale. Similarly, a single user session table 330 for all users could be used, as discussed in greater detail below with respect to FIG. 4.

In another preferred embodiment, hotlinks are not stored for later use. Each time a user logs on they are presented with the same predefined menu. The predefined menu may be unique to that user, or the same menu may be presented to all users. This embodiment is simpler because hotlinks are not stored for later use. Yet another preferred embodiment has a combination of predefined menus, identical each time they are presented to the user, and user-defined menus which a particular user may create and alter according to that user's own preferences.

Menu preferences 322 include user-selectable options regarding the content of a main menu (see FIG. 5) and certain features of how Web pages are to be displayed. For example, in addition to preselected favorite Web sites, a user may request that menus be created dynamically according to the time of day, as well as with respect to the profile of the user. This allows menus to be tailored to the particular timing and content needs of the user.

Figure 4:
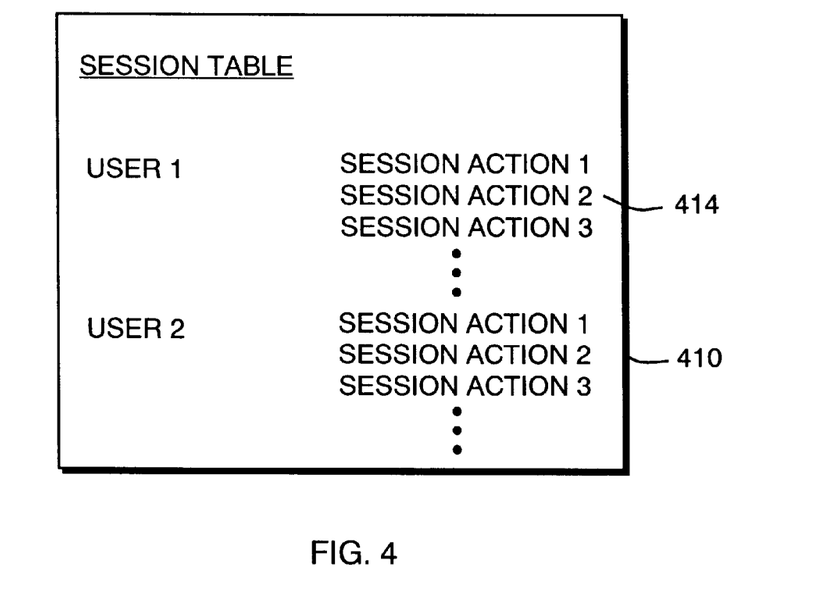
FIG. 4 is a block diagram showing a session table stored at a server in accordance with a preferred embodiment of the invention.

FIG. 4 is a block diagram showing some of the information stored by session manager 214 in server 110. In particular, FIG. 4 shows a session table 410 maintained by server 110 storing information for each user for each active session in progress. Each user entry 414 contains information regarding information from a user and information sent to a user during each session. In this manner, server 110 knows exactly the state of each user during a particular session. This information may be discarded when the session ends. Alternatively, the information may be used by server 110 to develop user profile information for later use.

Figure 5:
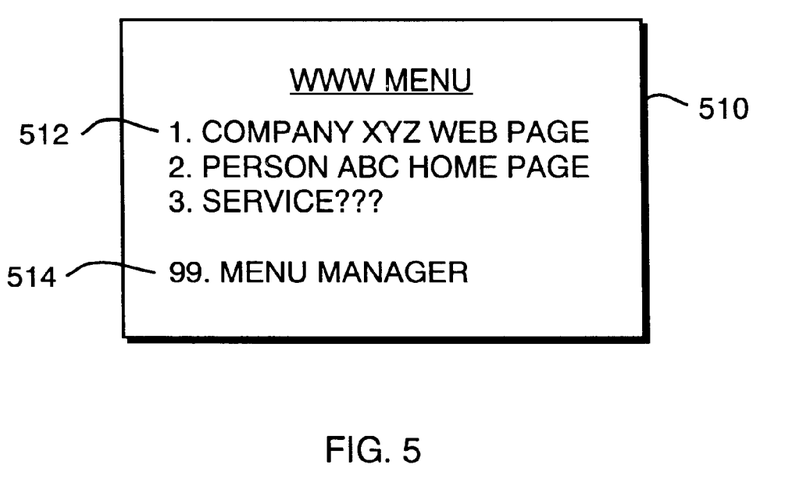
FIG. 5 is an example of a menu which may be used in a preferred embodiment.

FIG. 5 is a display screen 510 showing a menu used in one preferred embodiment. Display screen 510 is generated locally by server 110. The menu may provide a visual display of previously selected user hotlinks 512. The menu may also include system management options, represented by a menu manager selection 514. In another embodiment, display screen 510 contains the same choices, or a mix of same choices and user-defined choices, each time it is presented. For example, the menu may offer a certain number of predefined services subscribed to by a user. Alternatively, the choices may be predefined by a service provider in accordance with various subscriber plans.

A user inputs one of the displayed selection numbers into an infrared remote control which transmits selection signals to set top box 112. As described above, set top box 112 and server 110 respond accordingly based on the user selection signals. The main menu shown in FIG. 5 may also include other user selectable options related to the general operation of the Internet gateway video server 110 and set top box 112.

Figure 6:
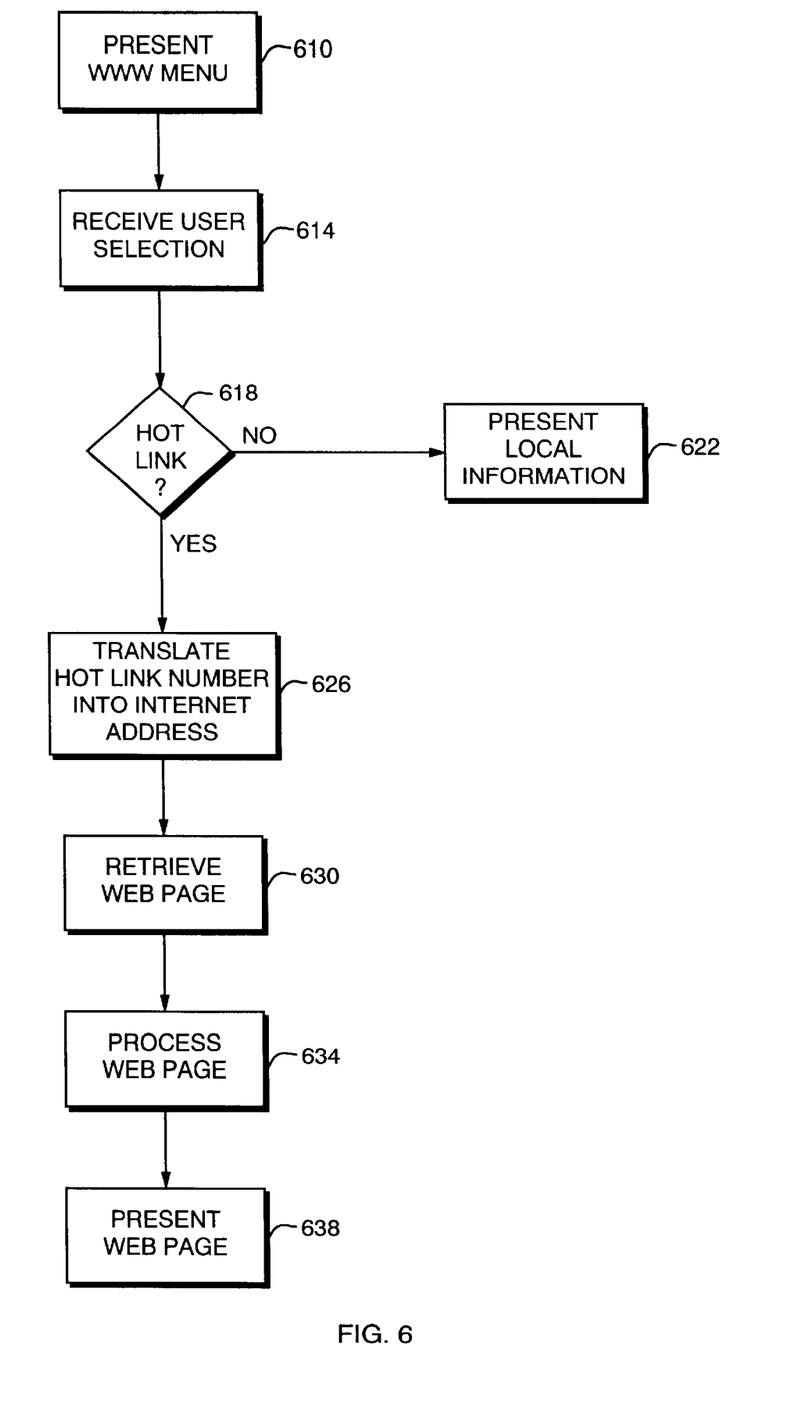
FIG. 6 is a flow chart showing the overall processing performed by a server in accordance with a preferred embodiment.

FIG. 6 is a flow chart showing the overall processing performed by server 110. The user is first presented with a menu (step 610). A user selection from the menu is then received (step 614). The user selection will either be a Web page request requiring Web access (step 618), or a selection which requires that information be generated locally by Internet gateway video server 110 and sent to the appropriate set top box 112 (step 622). Locally generated information may include, for example, menus and administrative information related to a user's service.

If the user selects a WWW page, the user Web page selection is translated into an Internet address (step 626). Server 110 retrieves the Web page associated with the translated Internet address (step 630). The Web page is then processed to transform the Web-based format into signals suitable for display on television 114 (step 634). The processed Web page is then transmitted to television 114 via set top box 112 and displayed to the user (step 638).

Alternatively, the Web-based information could be delivered directly to set top box 112 for conversion into television signals at the set top box 112. This would relieve the load of server 110, but require much greater processing power in the set top box 112.

Figure 7:
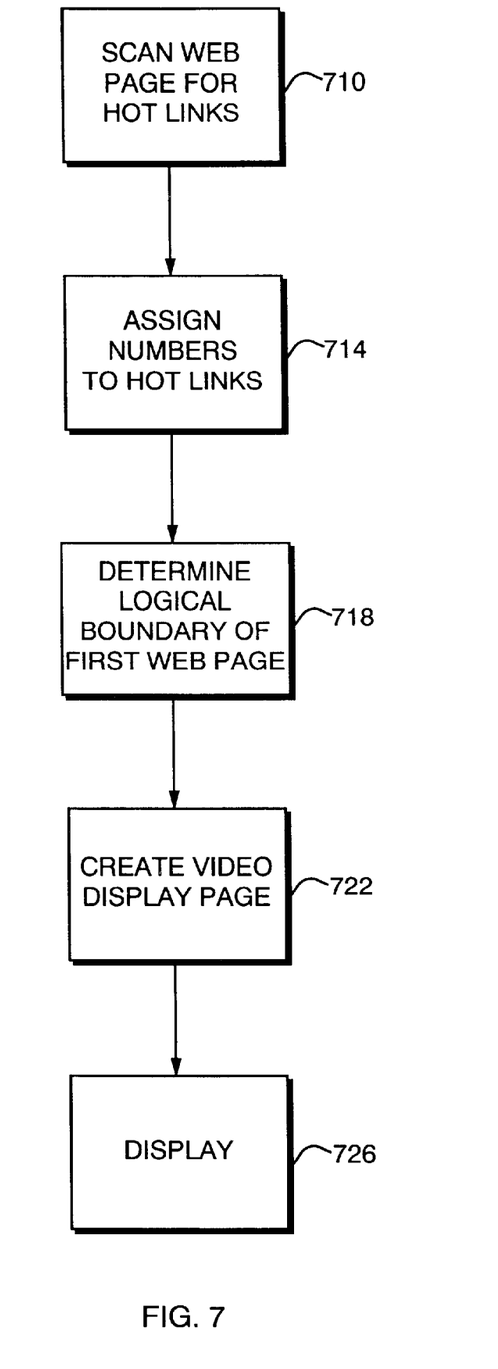
FIG. 7 is a flow chart showing the processing performed in transforming a Web page into information appropriate for display on a television.

FIG. 7 is a flow chart showing the processing performed in transforming a Web page into a table of information which is used to develop signals appropriate for display on television 114 (FIG. 6, step 634). The Web page is first scanned to determine the hyperlinks in the page (step 710). For example, in the WWW environment, which typically utilizes HyperText Markup Language (HTML), the Web page is scanned for tags indicating references to hyperlinks.

If a hyperlink is detected, information such as a number, letter or symbol, is inserted into the HTML page near the hyperlink, thus assigning numbers or other symbols to hyperlinks (step 714). When the HTML page is later converted into RGB computer graphics, and subsequently into NTCS format, the inserted information will also be translated into visual indicia corresponding to the hyperlink. For example, when the first hyperlink is detected a "1" might be inserted into the HTML document near the first hyperlink. When the second hyperlink is detected a "2" is inserted into the HTML document. Therefore, the original contents of the HTML document are augmented with additional visual indicia corresponding to each hyperlink.

The information developed from the scan of the Web page is also used to form a table that contains the correspondence between the inserted information and the associated hyperlink. The table is used to translate requests received from the user into hyperlink information.

The HTML document is then converted into RGB computer graphics, and subsequently translated into NTSC format, as is understood in the art. This process may include translation of graphics information into a format suitable for display on the television. For example, fonts and font sizes may be translated.

The Web page is then logically divided into a first display page in accordance with the size of the television display screen (step 718). From this translated information and division into a logical display page, a video display appropriate for television 114 is created (step 722). Finally, the translated Web page is displayed (step 726). Because an entire Web page may not be displayable on a single television screen, the user may scroll or page through the Web page by requesting server 110 for further scrolled or paged portions of the page.

The information defining the correspondence between hyperlinks in the retrieved Web page and the select information which is displayed is used later to translate the user selection information back into a hyperlink, or network location. The session manager ensures that the appropriate data structures for creating user selections and translating them back into hyperlinks is available to the system processes which utilize these data structures.

Figure 8:
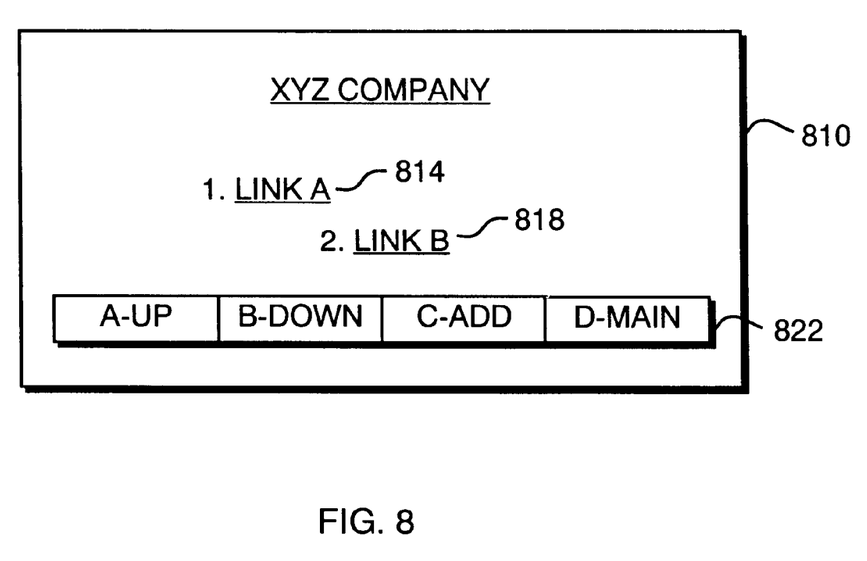
FIG. 8 shows a display screen of a typical Web page on a television.

FIG. 8 shows an example display screen of a Web page on a television in accordance with a preferred embodiment. In the example, display 810 shows a Web page for the XYZ Company. Hyperlinks 814 and 818 have an appearance similar to the format and placement of the original Web page from which it was generated. Note, however, that the television display screen has numbers corresponding to each hyperlink, as denoted by numerals "1" and "2". The user may input these numerals into the infrared remote as selection signals which are sent to the set top box 112 and/or server 110.

In this manner, the user input operates to select information in a manner similar to selection of a hyperlink as normally used in computer-generated Web pages. Note also option bar 822 which presents navigation options to the user. The navigation options allow a user to move to other areas of the currently displayed Web page (denoted by "A" and "B"), add the current Web page as a new hotlink selection to the main menu shown in FIG. 5 (denoted by "C"), and return to the main menu (denoted by "D"). The menu presented to the user may change dynamically in accordance with the current state of the session. For example, if the session is occurring at a particular time, the menu may change to present different selections corresponding to the particular time. This information may be kept in the user menu preferences area, or by server 110, depending on the nature of the changes.

FIG. 8 may take other forms as well. For example, instead of using numbers and letters for user-selectable options, iconic symbols or other selectable visual indicia may be used.

In response to a user selecting one of the hyperlinks using a device such as a remote control, a signal is sent by user interface 116 to set top box 112, which processes the signal, sends a signal to server 110, or both responds to the signal and passes it on. In response to a user selection of a particular hyperlink, server 110 sets up a network connection to retrieve the selected Web page. In response to a user selecting one of the option bar 822 options, a signal is sent in a similar manner to server 110 via set top box 112. In this instance, however, information is generated locally by Internet gateway video server 110 for display on TV 114. Alternatively, the set top box 112 may handle the response to the menu option bar 822.

Figure 9:
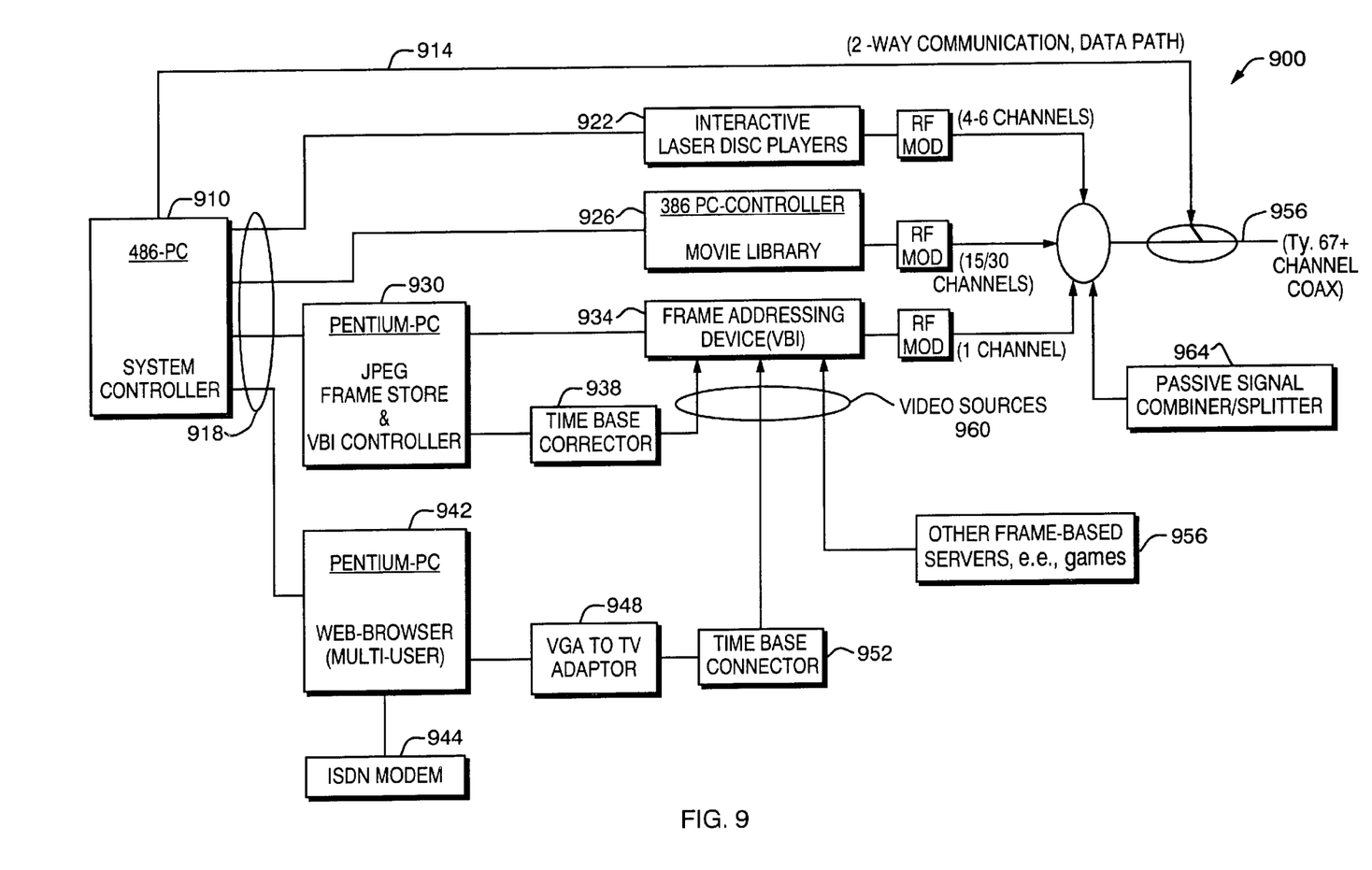
FIG. 9 is a block diagram showing a preferred embodiment of the invention used in a multiple video source environment.

FIG. 9 is a block diagram showing a preferred embodiment of the invention used in a server headend. FIG. 9 shows a headend coaxial cable system 900 for providing various types of user-selectable video programming over a coaxial channel. A preferred embodiment of the invention using the principles described above is implemented primarily by system controller 910, Pentium PC 942, VGA to TV adapter 948, time base corrector 952, frame addressing device 934, and the two-way communication data path 914 between system controller 910 and coaxial cable 956. System controller 910 may be implemented using a 486-based PC. System controller 910 communicates over coaxial cable 956 via two-way data communications path 914.

System controller 910 also communicates with several of the system elements via control and communication lines 918. Control and communication lines 918 may be implemented, for example, using an RS-232 type interface. System controller 910 controls interactive laser disc players 922, movie library 926, JPEG frame store and VBI controller 930, and Web browser 942. JPEG frame store and Vertical Blanking Interval (VBI) controller 930 and Web browser 942 place information on the coaxial cable via frame addressing device (VBI) 934. In this embodiment, Web browser 942 carries out the functions of session manager 214 and Web browser 226 of FIG. 2. Each of interactive laser disc player 922, movie library 926, and frame addressing device 934 send signals through a respective RF modulator onto the coaxial cable 956 via passive signal combiner/splitter 964.

Web browser 942 sends signals to VGA to TV adaptor 948, which in turn sends signals to time base corrector 952 for transmission to frame addressing device 934. VGA to TV adaptor 948 converts computer output data into NTSC scan lines. The adaptor may be implemented using, for example, a Magnicorder® device. Time base corrector 952 may be implemented using, for example, a Hotronics® time base corrector, or similar device.

Similarly, JPEG frame store and VBI controller 930 sends signals to time-base corrector 938, which in turn sends signals to frame addressing device 934. Frame addressing device 934 also receives control signals from JPEG frame store and VBI controller 930. Finally, frame addressing device 934 receives signals from other frame-based servers, such as video games, indicated generally by 956. In summary, frame addressing device transmits signals from multiple video sources, indicated generally by 960.

In accordance with a preferred embodiment of the present invention, a user sends selection signals to a set top box 112 which are, in turn, transmitted on coaxial cable 956, via two-way communication data path 914, to system controller 910. Controller 910 takes the user selection signals and processes them to control the various video sources of information. With respect to the preferred embodiment, system controller 910 sends selection signals to Web browser 942, which initiates retrieval of the requested Web page via ISDN modem 944.

Although FIG. 9 demonstrates the invention being used in coordination with multiple other sources of video, headend 900 could merely comprise a multi-user web browser which responds to user requests for WWW information.

V. CONCLUSION

The present invention thus allows multiple users to access the Internet, or other networks, via a high speed channel using only a set top box 112 and television. It provides users with a variety of advantages. For example, users no longer must have a personal computer in their home to access the Internet. The invention also allows users to access the WWW from their television sets. The only costs associated with such an architecture are those of the set top box 112 and remote. Homes with cable TV already require similar devices. The present invention also circumvents the need to interact with the menus and WWW using a mouse tethered to a device. Users can view the WWW with the ease of a remote control. Various modifications and variations can be made in the set top box 112 of the present invention and in construction of this server without departing from the scope or spirit of the invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. Apparatus for retrieving and retransmitting data processing network information in response to a user selection request, comprising:

means for transmitting first selection information to be displayed on a television;

means for receiving a user selection request based on the transmitted first selection information;

means for retrieving data processing network information, in a network format, corresponding to the user selection request;

means for transforming the data processing network information from the network format having a first interactive element to a television format having a second interactive element; and means for transmitting the data processing network information in the television format to the television.

2. The apparatus of claim 1, wherein the means for transforming includes:
   means for scanning the retrieved data processing network information to identify second selection information as the first interactive element; and
   transforming the data processing network information by creating television information having third selection information corresponding to the second interactive element.

3. The apparatus of claim 1, wherein the first selection information comprises a menu, and wherein the means for receiving a user selection request includes means for receiving a signal corresponding to a selection from the menu.

4. The apparatus of claim 3, further comprising means for customizing the menu.

5. The apparatus of claim 1, wherein the means for receiving a user selection request includes:
   means for translating the user selection request into the network location.

6. The apparatus of claim 1, wherein the means for receiving a user selection request includes:
   means for receiving signals from a set top box connected to the television.

7. The apparatus of claim 1, wherein the means for receiving a user selection request includes:
   means for receiving signals from a distribution system.

8. The apparatus of claim 1, wherein the means for retrieving network information includes:
   an interface to the Internet.

9. The apparatus of claim 1, wherein the means for retrieving network information includes:
   means for managing multiple user sessions.

10. The apparatus of claim 1, wherein the means for retrieving network information includes:
   means for logging user session activity.

11. The apparatus of claim 1, wherein the means for retrieving network information includes:
   means for caching network information.

12. The apparatus of claim 1, wherein the means for transmitting includes:
   means for transmitting the television information over a television distribution system.

13. A method of retrieving and retransmitting data processing network information in response to a user selection request, comprising:
   transmitting first selection information to be displayed on a television;
   receiving a user selection request based on the transmitted first selection information;
   retrieving data processing network information, in a network format, corresponding to the user selection request;
   transforming the data processing network information from the network format having a first interactive element to a television format having a second interactive element; and
   transmitting the data processing network information in the television format to the television.

14. The method of claim 13, wherein the step of transforming includes the substeps of:
   scanning the retrieved data processing network information to identify second selection information as the first interactive element; and
   transforming the data processing network information by creating television information having third selection information corresponding to the second interactive element.

15. The method of claim 13, wherein the first selection information includes a menu, and wherein the receiving a user selection request includes the substep of:
   receiving a signal corresponding to a selection from the menu.

16. The method of claim 15, further comprising:
   means for customizing the menu.

17. The method of claim 13, wherein the receiving a user selection request includes the substep of:
   translating the user selection request into the network location.

18. The method of claim 13, wherein the receiving a user selection request includes the substep of:
   receiving signals from a set top box connected to the television.

19. The method of claim 13, wherein the receiving a user selection request includes the substep of:
   receiving signals from a distribution system.

20. The method of claim 13, wherein the retrieving network information includes the substep of:
   interfacing to the Internet.

21. The method of claim 13, wherein the retrieving network information includes the substep of:
   managing multiple user sessions.

22. The method of claim 13, wherein the retrieving network information includes the step of:
   logging user session activity.

23. The method of claim 13, wherein the retrieving network information includes the substep of:
   caching the network information.

24. The method of claim 13, wherein the transmitting includes the substep of:
   transmitting the television information over a distribution system.

25. A system for retrieving data processing network information in response to a user selection request, and retransmitting the data processing network information to a set top box, comprising:
   a set top box connected to a television for transmitting television information to the television and for transmitting user selection requests; and
   means for retrieving data processing network information, comprising:
      means for transmitting first selection information to the set top box for display on the television;
      means for receiving a user selection request based on the transmitted first selection information;
      means for retrieving data processing network information, in a network format having a first interactive element, corresponding to the user selection request;
      means for transforming the data processing network information from the network format to a television format having a second interactive element; and
      means for transmitting the data processing network information in the television format to the set top box for display on the television.

26. The apparatus of claim 25, wherein the means for transforming includes:
   means for scanning the retrieved data processing network information to identify second selection information as the first interactive element; and transforming the data processing network information by creating television information having third selection information corresponding to the second interactive element.

27. The apparatus of claim 25, wherein the first selection information comprises a menu, and wherein the means for receiving a user selection request includes means for receiving a signal corresponding to a selection from the menu.

28. The apparatus of claim 27, further comprising means for customizing the menu.

29. The apparatus of claim 25, wherein the means for receiving a user selection request includes:

means for translating the user selection request into the network location.

30. The apparatus of claim 25, wherein the means for receiving a user selection request includes:

means for receiving signals from a set top box connected to the television.

31. The apparatus of claim 25, wherein the means for receiving a user selection request includes:

means for receiving signals from a distribution system.

32. The apparatus of claim 25, wherein the means for retrieving network information includes:

an interface to the Internet.

33. The apparatus of claim 25, wherein the means for retrieving network information includes:

means for managing multiple user sessions.

34. The apparatus of claim 25, wherein the means for retrieving network information includes:

means for logging user session activity.

35. The apparatus of claim 25, wherein the means for retrieving network information includes:

means for caching network information.

36. The apparatus of claim 25, wherein the means for transmitting includes:

means for transmitting the television information over a television distribution system.

\* \* \* \* \*

(12) EX PARTE REEXAMINATION CERTIFICATE (8783rd)

United States Patent
Lin et al.

(10) Number: US 6,381,748 C1
(45) Certificate Issued: Jan. 3, 2012

(54) APPARATUS AND METHODS FOR NETWORK ACCESS USING A SET TOP BOX AND TELEVISION

(75) Inventors: Eric Lin, Westwood, MA (US); Howard S. K. Wan, Lexington, MA (US)

(73) Assignee: Verizon Communications Inc., New York, NY (US)

Reexamination Request:
No. 90/011,725, Jun. 2, 2011

Reexamination Certificate for:
Patent No.: 6,381,748
Issued: Apr. 30, 2002
Appl. No.: 08/853,035
Filed: May 2, 1997

(51) Int. Cl.
*H04N 7/173* (2006.01)

(52) U.S. Cl. ......................... 725/109; 725/116
(58) Field of Classification Search ........... None
See application file for complete search history.

(56) References Cited

To view the complete listing of prior art documents cited during the proceeding for Reexamination Control Number 90/011,725, please refer to the USPTO's public Patent Application Information Retrieval (PAIR) system under the Display References tab.

*Primary Examiner* — Andrew Nalven (57) ABSTRACT

An Internet gateway video server transmits selection information to a set top box connected to a television. The set top box displays the selection information on the television. A user views the selection information, and inputs user selection requests to the set top box. The Internet gateway video server receives user the requests for information and retrieves the information. The server then converts the network information from a network format to a television format. The conversion includes scanning the network information for selection elements, and adding selection elements for transmission in the television format. The converted network information is then transmitted to the set top box for display on the television. The user may then make further selections based on the displayed network information.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 13, 15, 17, 20, 22 and 23 is confirmed.

Claims 1-12, 14, 16, 18, 19, 21 and 24-36 were not reexamined.

* * * * *